R. MOORE.
APPARATUS FOR SELECTING AND SEPARATING WARP THREADS IN THE PREPARATION OF THE WARP FOR LOOMS FOR WEAVING.
APPLICATION FILED MAY 25, 1916.

1,259,546.

Patented Mar. 19, 1918.
5 SHEETS—SHEET 3.

Inventor:
Robert Moore,
by Knight Brown Quinby Meary
Attorneys.

UNITED STATES PATENT OFFICE.

ROBERT MOORE, OF BLACKBURN, ENGLAND.

APPARATUS FOR SELECTING AND SEPARATING WARP-THREADS IN THE PREPARATION OF THE WARP FOR LOOMS FOR WEAVING.

1,259,546.   Specification of Letters Patent.   Patented Mar. 19, 1918.

Application filed May 25, 1916. Serial No. 99,903.

*To all whom it may concern:*

Be it known that I, ROBERT MOORE, a subject of the King of Great Britain, residing at 27 Coleridge street, Blackburn, in the county of Lancaster, England, have invented certain new and useful Improvements in Apparatus for Selecting and Separating Warp-Threads in the Preparation of the Warp for Looms for Weaving, of which the following is a specification.

This invention relates to apparatus for selecting and separating warp threads in the preparation of the warp for looms for weaving, and to that type of apparatus in which a carriage having a selector needle with a hook device at one side is caused to travel past the warp threads while the latter are in a stretched condition, the selector needle as it approaches each warp thread engaging same with a forward movement and transferring it with a diagonal movement onto a guide frame along which the selected threads are spaced in a position for enabling them to be drawn through the healds and reed by the operator.

In machines of this class motion has been imparted to the carriage and selector needle by a treadle controlled by the operator a depression of the treadle being required for each thread that is selected.

According to this invention the carriage is driven by electrical or mechanical power and is provided with two warp feelers of which one automatically stops the traverse of the carriage at intervals to prevent undue crowding of the unselected warps, and the other, by breaking an electrical contact or by bringing a brake or stop motion into operation automatically stops the machine or puts the selecting and separating mechanism out of operation in the event of the selected threads accumulating faster on a separating guide than they can be taken off by the operator.

A feature of the invention consists in employing a toothed guide on which the warp threads are deposited by the selector needle and which advances to present a fresh space or tooth for each succeeding selected thread or group of selected threads, the said movement of the guide also advancing the selected threads toward the feeler which controls the electrical contact or stop motion. The toothed guide advantageously comprises two ratchet wheels which are spaced a slight distance apart from one another so that they hold the portion of the warp thread which crosses and lies between them, in a rigid condition suitable for imparting movement to the feeler last mentioned.

In the accompanying drawings—

A indicates the carriage, B the selector needle, which acts as a warp feeler to stop the carriage at intervals, C the warp feeler which controls the stop motion and D the ratchet wheel which constitutes the toothed guide.

Figure 3:
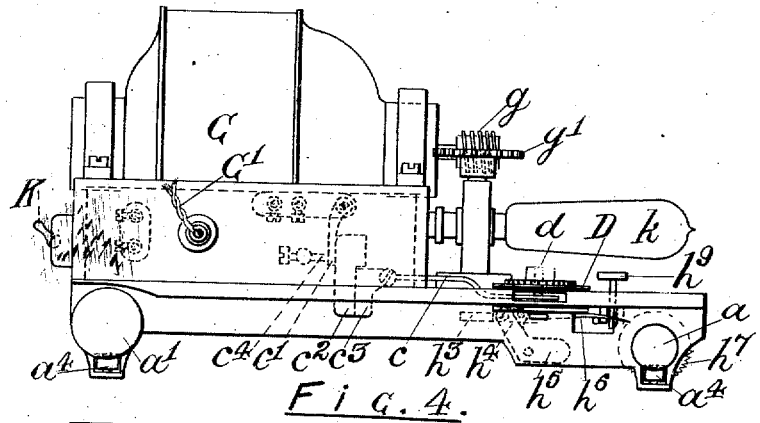
Fig. 3 is an elevation, Fig. 4 a plan and Fig. 5 an inverted plan of the carriage with its selecting and separating mechanism drawn to a larger scale.
Figure 4:
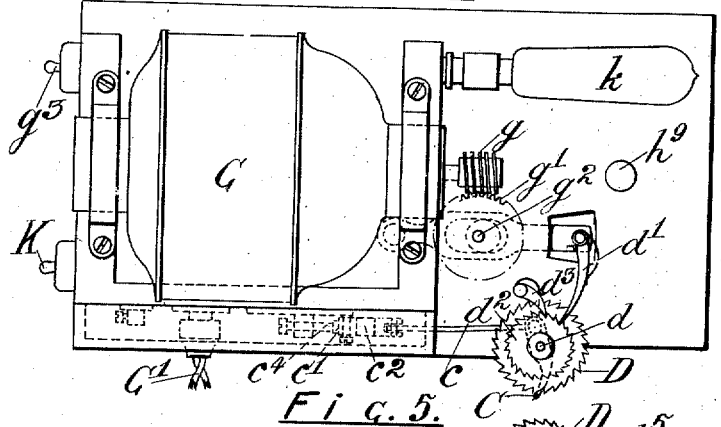
Figure 5:
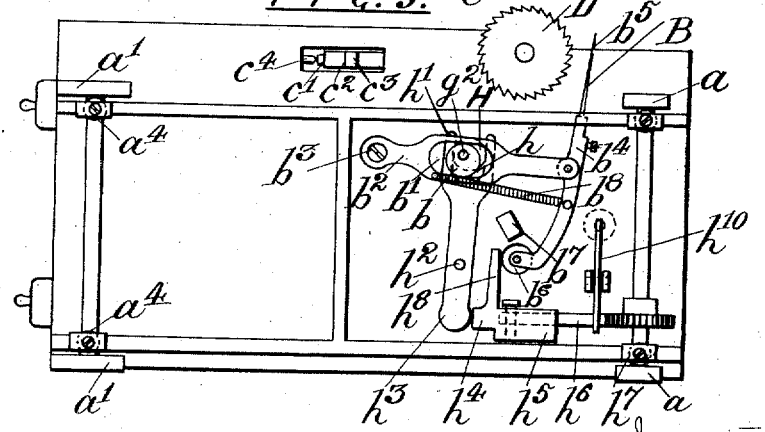

The carriage A has wheels $a$, $a^1$ which rest upon guides or rails $a^2$ on the frame E which supports the warp beam F and retains the warp threads $f$ in a stretched condition. The rails $a^2$ are advantageously recessed at $a^3$ to constitute bearing surfaces for wheels $a^4$ (Figs. 3 and 5). These wheels prevent the carriage running off the side of the track and reduce friction. They may however be dispensed with and flanged wheels may be used in place of the same and the wheels $a$, $a^1$. Mounted on the carriage is an electric motor G which is driven from any suitable source of electricity supply which may be conveyed to the motor through a flexible connection such as $G^1$. On the motor shaft is a worm $g$ gearing with a worm wheel $g^1$ that is rigidly fixed on a shaft $g^2$ which also carries two eccentrics $b$ and H (Fig. 5) which are set one in advance of the other. The eccentric $b$ works in a slot $b^1$ in a lever $b^2$ that is pivoted at $b^3$ and has pivotally attached to its free end a holder $b^4$ which carries the selector needle B which is formed near its free end with a narrow groove or notch $b^5$. Mounted on the rear end of the needle holder is a bowl or runner $b^6$ which travels over a projection or cam surface $b^7$ on the underside of the carriage and causes the needle holder to turn about its pivot during the oscillatory movement of the slotted lever $b^2$, a spring $b^8$ causing the bowl or runner to engage the said cam surface during the movement of the lever $b^2$. This construction causes the needle B on its forward stroke to move outside the radius of the ratchet wheels D and toward the termination of such stroke to be tilted and occupy a position within the radius of the ratchet wheels which position it maintains for a portion of its return stroke and is then again moved outward from such wheels. Instead of the needle being situated below the wheels it may be arranged to work between, or above the same. The latter are mounted on an axle $d$ and receive an intermittent rotary motion from a pawl $d^1$ (Fig. 4) pivoted to the lever $b^2$ and engaging a ratchet wheel $d^2$ rigidly connected with the spaced ratchet wheels D. These wheels are advanced one tooth during each forward movement of the lever $b^2$ and prevented from turning back, or from turning back beyond a predetermined distance by a pawl $d^3$. The eccentric H works in a slot $h$ in a lever $h^1$ that is pivoted at $h^2$ and has an arm $h^3$ that is adapted to bear against one arm $h^4$ of a lever whose other arm $h^5$ is weighted. Pivoted to the arm $h^4$ is a catch or pawl $h^6$ which engages a ratchet wheel $h^7$ on the axle of the front wheels $c$. Each time the arm $h^4$ advances it actuates the catch $h^6$ to rotate the front axle through a predetermined distance and so cause the carriage to travel forward with a slow intermittent motion. The return movement of the lever is effected by the bowl or runner $b^6$ which is brought to bear upon a projection $h^8$ on the arm $h^4$ of the weighted lever through the action of the spring $b^8$. To enable the carriage to be moved backward when required a stud or key $h^9$ is fixed at one end of a lever $h^{10}$ of which the other end passes under the catch or pawl $h^6$ so that when the stud or key is depressed, the catch or pawl is lifted out of engagement with the ratchet wheel $h^7$ of the front axle. The warp feeler C which controls the stop motion comprises a lever which is pivoted between the ratchet wheels D. One end of this lever projects to or beyond the teeth of the said wheels and the other end is connected by a link $c$ with a movable contact $c^1$ through the intervention of an insulation piece $c^2$ and weight $c^3$ the contact $c^1$ being adapted to be moved into and out of contact with a stationary contact $c^4$ for making and breaking the motor circuit.

The warp beam F is conveniently supported near the bottom of the frame E by hooked brackets $f^1$ and a form of apparatus for supporting and stretching the warp threads $f$ comprises a roller $f^2$, a clamping roller $f^3$, and a pair of clamps $f^4$. The clamping roller $f^3$ is formed with a longitudinal groove $f^5$ to receive a bar $f^6$ which is secured in such groove by screws, rings or clamps. This roller is provided with a worm wheel $f^7$ operated by a worm $f^8$ and handle $f^9$. The lower pair of clamps $f^4$ comprise two bars lined with felt or other appropriate material and secured together by spring clips $f^{10}$ which will hold the warp threads in a stretched position and yet allow them to be pulled through by the operator for threading purposes and for getting an even tension on the threads. The clamps $f^4$ are advantageously mounted on a pair of arms $f^{11}$ one at each end of the machine and arranged to occupy either of two positions at will. For this purpose each arm $f^{11}$ is provided with another arm $f^{12}$ having a projection $f^{13}$ at its end and rigidly fixed on a shaft $f^{14}$ in proximity to these arms are two catches $f^{15}$. The upper end of each catch is formed with a recess $f^{16}$ to interlock with the end of the arm $f^{12}$ when the latter occupies the position shown by the full lines in Fig. 2. The lower end of each catch is heavier than the upper end and is recessed at $f^{17}$ to engage the projection $f^{13}$ when the parts occupy the position shown by the broken lines in Fig. 2.

Figure 1:
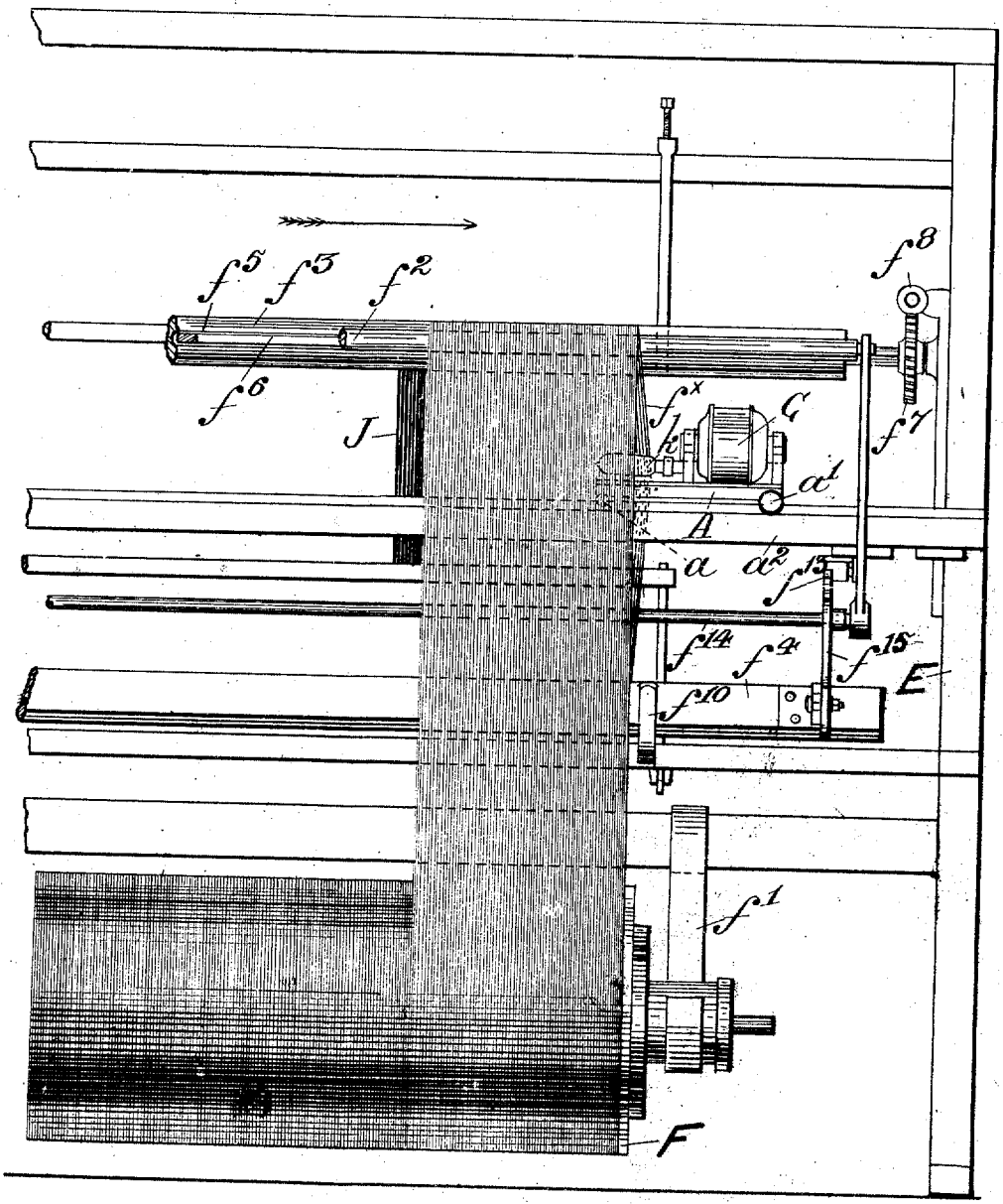
Figure 1 is a front elevation of the apparatus for selecting and separating warp threads constructed in accordance with this invention.
Figure 2:
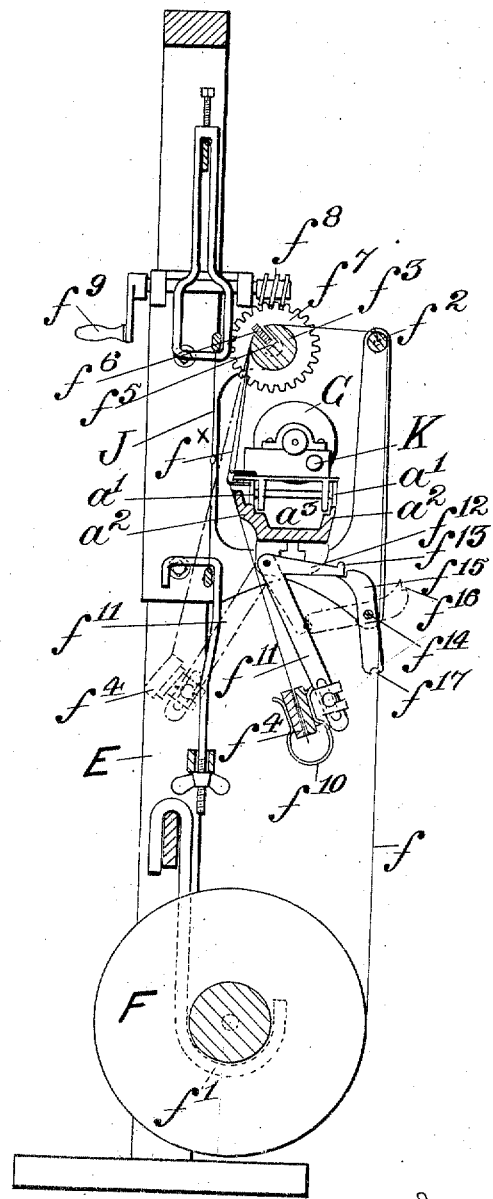
Fig. 2 is a transverse section of the apparatus looking in the direction of the arrow shown in Fig. 1.

After the beam F has been placed in position, the taper's striker comb to which the ends of the warp threads are fastened are passed over the rollers $f^2$ $f^3$ to the clamps $f^4$. During this operation the arms $f^{11}$ occupy the position shown by the broken lines with one of the clamp members $f^4$ removed as shown in Fig. 2. The warp threads are now brushed to cause the fibers to lie in one direction so that the warp threads will not cling to one another during the subsequent selecting operation and cause the selecting needle B to take more than one thread at a time. When this operation has been completed, the clamp member $f^4$ is replaced and secured to the other clamp member by the spring clips $f^{10}$.

The clamps are then moved in an upward direction to disengage the projections $f^{13}$ from the recesses $f^{17}$ whereupon the catches $f^{15}$ return to their upright position. The clamps are now moved back until the arms $f^{12}$ rise above the catches $f^{15}$ and rest upon the recessed portions $f^{16}$ therein, the shoulders formed by the recessed portions causing the parts to be retained in the position indicated by the full lines in Fig. 2 until the catches $f^{15}$ are again turned to move their upper ends away from the arms $f^{12}$. The warp threads are now pressed into the groove $f^5$ in the roller $f^3$ by the bar $f^6$ which is then secured in the manner described. The handle $f^9$ is now turned to tighten the warp threads and draw all threads to an even tension. The healds J are now placed in position and the carriage A is placed upon the rails $a^2$ in suitable proximity to the warp threads. $g^3$ (Fig. 4) indicates a switch for starting and stopping the motor and K indicates a switch for a lamp $k$ that is conveniently fixed at the front of the motor. As soon as the latter is started the carriage advances with an intermittent motion toward the warp threads and the selector needle comes in contact therewith and each time such needle moves forward it deposits a thread between two of the teeth on the spaced ratchet wheel D which as already mentioned advances through a space of one tooth at each forward movement of the needle. The threads $f^x$ are the threads that have been separated and selected by the machine, their position being somewhat exaggerated for the sake of clearness. If the machine is feeding too quickly the pressure of the warp threads against the needle overcomes the pull exerted by the spring $b^8$ and prevents the bowl or runner $b^6$ from acting upon the projection $h^8$ on the arm $h^4$ to effect the return movement of the catch or pawl $h^6$. When this takes place the carriage stops and remains stationary until the pressure against the selector needle is relieved by the needle continuing to select threads while the carriage remains stationary. As soon as this pressure is relieved the selector needle can again move through its ordinary course and allow the pawl $h^6$ to come into gear with its ratchet wheel whereupon the carriage commences to travel. As the threads are deposited in a spaced position across the ratchet wheels D as shown at $f^x$ they are taken off by the drawer-in and drawn through the heald eyes and if such person is unable to keep up with the machine, the threads are carried forward by the rotation of the wheels until they come into contact with the feeler C and turn the latter to a position in which the movable contact $c^1$ is separated from the stationary contact $c^4$. When this takes place the motor stops and remains at rest until the threads have been picked off the ratchet wheels whereupon the feeler is returned to its normal position by the weight $c^3$ and the electrical contact is reestablished and the motor restarted.

Figure 6:
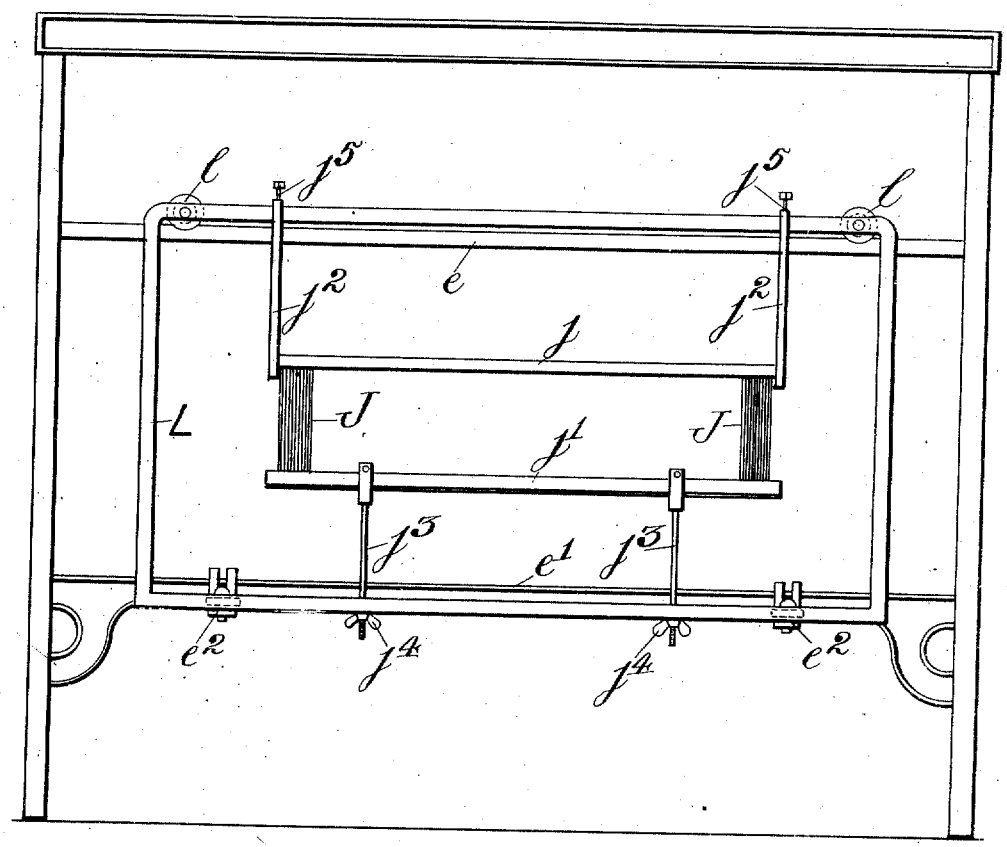
Fig. 6 is an elevation of a traveling heald frame.

Adverting to Fig. 6 L indicates a traveling or movable frame which can be moved to any desired position in relation to the frame carrying the warp threads to bring any heald eye directly opposite to its respective warp thread or threads and so render the drawing-in operation unaffected by variations between the length across the beam and the length across the healds.

Figure 7:
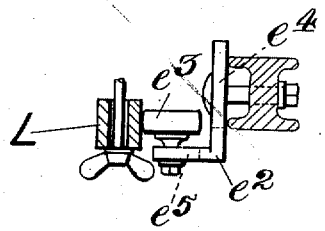
Fig. 7 is a section taken through the lower part of the frame.

In the example shown the frame L is provided at its upper part with flanged wheels $l$ which rest upon a rail $e$ on the drawing-in frame. The lower part of the frame L conveniently comprises two spaced bars fixed to opposite sides of the vertical members of the frame. Attached to a rail $e^1$ on the drawing-in frame are two brackets $e^2$ on which are mounted wheels or runners $e^3$ (Fig. 7). These brackets may be capable of vertical and longitudinal adjustment in relation to the rail $e^1$ and the wheels or runners $e^3$ may also be arranged to be adjustable on the brackets $e^2$ so as to occupy a position closer to or farther away from the rail in accordance with the position to be occupied by the frame L. A method of enabling these adjustments to be effected consists in forming the brackets with slots $e^4$, $e^5$. $j$, $j^1$ indicate the upper and lower heald staves which carry the healds J. The upper staves $j$ are suspended by links or stirrups $j^2$ from the top rail of the frame L and the lower heald staves $j^1$ are connected by forked rods $j^3$ which pass between the spaced bars at the lower part of the frame L and are secured by winged nuts $j^4$ by means of which and adjusting screws $j^5$ on the links or stirrups $j^2$ the healds can be supported in a state of tension.

Figure 8:
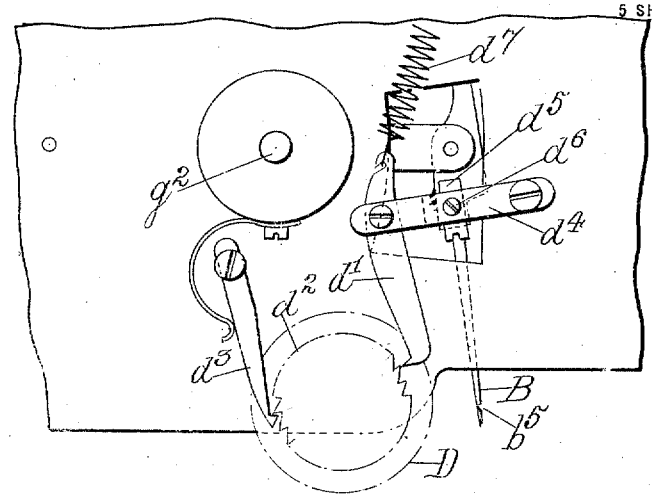
Fig. 8 is a plan showing a modified form of apparatus for imparting motion to the ratchet wheels.

In the modification shown in Fig. 8 the pawl $d^1$ is pivoted on an arm $d^4$ that is pivoted to the top of the carriage and provided with an abutment adapted to be engaged and moved in a forward direction by the end of the lever $b^2$ the return movement being effected by a spring $d^7$. In the example shown the abutment comprises a screw $d^5$ which can be adjusted to regulate the length of traverse of the pawl and secured in its adjusted position by a screw $d^6$.

Figure 9:
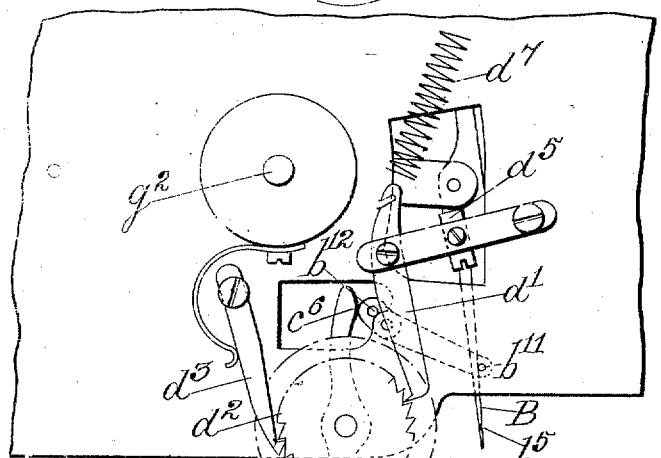
Fig. 9 is a plan showing a modified form of control apparatus and Fig. 10 is an inverted plan.
Figure 10:
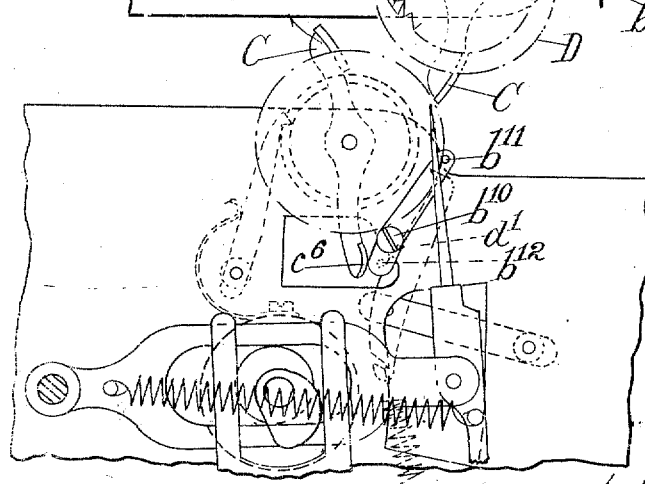

If a clockwork or other mechanical motor is employed or if the carriage is driven from any other source of power the feeler may operate upon a brake or other appropriate stop motion to bring the carriage to rest and put the selecting and separating mechanism out of operation. The modified form of control apparatus shown in Figs. 9 and 10 is applicable to any type of motor or driving mechanism whether mounted upon the carriage or not and a feature of the apparatus consists in causing the motion imparted to the feeler C by the selected threads to put the selecting and separating mechanism out of operation without necessarily stopping the motor or driving mechanism. In applying this principle to a machine provided with a selector needle B and toothed wheels D the feeler C is provided at one end $c^5$ with a projection $c^6$ or is otherwise adapted to engage the pawl $d^1$ or one arm of a two armed lever $b^9$ that is pivoted on a stud $b^{10}$ projecting from the underside of the carriage. The other arm of the lever $b^9$ has a projection or pin $b^{11}$ that is adapted to engage one side of the selector needle B and prevent its moving outwardly to select a thread. The action is as follows:—
When a thread on the toothed wheels D turns the feeler C, the projection $c^6$ moves the lever $b^9$ and a pin $b^{12}$ thereon moves the pawl $d^1$ out of gear with the ratchet wheel $d^2$ and the pawl $d^1$ can then continue its movements without imparting any further movement to the wheels D. Simultaneously, or approximately simultaneously with this movement the pin $b^{11}$ is brought against the side of the needle B and moves the latter away from the unselected threads so that as it moves forward it misses the latter and ceases to perform its selecting operation. When the thread or threads that have been exerting pressure upon the feeler C have been picked off the toothed wheels D the parts are returned to their normal positions by the spring $b^8$ attached to the lever $b^2$ and needle holder $b^4$.

What I claim by my invention and desire to secure by Letters Patent in the United States is:—

1. In apparatus for selecting and separating warp threads in which a power driven carriage containing warp selecting and separating mechanism is adapted to be driven past the warp threads, the combination of two warp feelers one of which is actuated by pressure of unselected warp threads to stop the traverse of the carriage at intervals and the other is actuated by pressure of selected warp threads to bring the whole machine to rest.

2. In apparatus for selecting and separating warp threads in which a power driven carriage containing warp selecting mechanism is adapted to be driven past the warp threads, the combination of two warp feelers and a thread separating guide, one warp feeler acting as a selector to transfer warp threads to the separating guide and being actuated by pressure of unselected warp threads to stop the traverse of the carriage at intervals and the other warp feeler being actuated by pressure of selected warp threads to bring the whole machine to rest.

3. In apparatus for selecting and separating warp threads in which a power driven carriage containing warp selecting and separating mechanism is adapted to be driven past the warp threads, the combination of a selector needle and a multiple toothed guide, means for actuating the selector needle to transfer the threads successively onto the multiple toothed guide, a feeler situated in proximity to the multiple toothed guide and arranged in operative connection with a stop motion, and means for advancing the multiple toothed guide to present a fresh space for each succeeding selected thread and carry the selected threads against the feeler whereby the latter is moved to actuate the stop motion to bring the machine to rest.

4. In apparatus for selecting and separating warp threads in which a carriage containing warp selecting and separating mechanism is adapted to be driven past the warp threads, a selector needle mounted on the carriage, a multiple-toothed movable thread selector on which a number of threads are successively deposited by the selector needle, a warp feeler mounted on the carriage and controlled by the pressure of the foremost of the selected threads to put the machine out of operation when a number of such threads have been deposited on the separator and a motor mounted on the carriage and arranged to impart a traversing motion thereto and to actuate the selector needle and thread separator.

5. In apparatus for selecting and separating warp threads in which a carriage containing warp selecting and separating mechanism is adapted to be driven past the warp threads, a selector needle, a multiple toothed movable thread separator on which a number of threads are successively deposited by the selector needle, a warp feeler actuated by pressure of the unselected threads to stop the traverse of the carriage at intervals, and another feeler actuated by pressure of a selected thread to put the selecting and separating mechanism out of operation.

6. In apparatus for selecting and separating warp threads in which a carriage containing warp selecting and separating mechanism is adapted to be driven past the warp threads, a thread separator comprising two toothed wheels arranged coaxially and spaced a slight distance apart, a feeler pivoted between the same, a stop motion arranged in operative connection with such feeler, a selector needle arranged to deposit selected threads across such wheels, and means for imparting an intermittent rotary motion to the latter.

In testimony whereof I affix my signature in presence of two witnesses.

ROBERT MOORE.

Witnesses:
ARTHUR AVERY,
G. P. APPLEYARD.